(12) United States Patent
Paczkowski et al.

(10) Patent No.: US 10,750,351 B1
(45) Date of Patent: Aug. 18, 2020

(54) WIRELESS DATA NETWORK DISTRIBUTED LEDGER ANALYSIS TO DETECT AND IDENTIFY ANALYTIC INFORMATION

(71) Applicant: Sprint Communications Company L.P., Overland Park, KS (US)

(72) Inventors: Lyle Walter Paczkowski, Mission Hills, KS (US); Ivo Rook, New York, NY (US); Ronald R. Marquardt, Woodinville, WA (US)

(73) Assignee: Sprint Communications Company L.P., Overland Park, KS (US)

( * ) Notice: Subject to any disclaimer, the term of this patent is extended or adjusted under 35 U.S.C. 154(b) by 88 days.

(21) Appl. No.: 16/154,609

(22) Filed: Oct. 8, 2018

(51) Int. Cl.
| | |
|---|---|
| *H04W 8/18* | (2009.01) |
| *H04W 24/00* | (2009.01) |
| *H04L 12/26* | (2006.01) |
| *G06F 16/18* | (2019.01) |
| *H04L 12/46* | (2006.01) |
| *H04L 29/08* | (2006.01) |
| *H04L 12/24* | (2006.01) |

(52) U.S. Cl.
CPC .......... *H04W 8/18* (2013.01); *G06F 16/1805* (2019.01); *H04L 12/4625* (2013.01); *H04L 41/20* (2013.01); *H04L 41/28* (2013.01); *H04L 43/04* (2013.01); *H04L 67/101* (2013.01); *H04L 67/104* (2013.01); *H04W 24/00* (2013.01)

(58) Field of Classification Search
CPC ..... H04L 12/4625; H04L 41/20; H04L 41/28; H04L 63/101; H04L 67/104; H04L 67/109
See application file for complete search history.

(56) References Cited

U.S. PATENT DOCUMENTS

| | | | |
|---|---|---|---|
| 10,594,034 B1 * | 3/2020 | Tran | H01Q 19/09 |
| 2009/0094318 A1 | 4/2009 | Gladwin et al. | |
| 2014/0141768 A1 * | 5/2014 | Javaid | G06F 11/3072 455/423 |
| 2018/0139042 A1 | 5/2018 | Binning et al. | |
| 2018/0197156 A1 | 7/2018 | Beesley et al. | |
| 2018/0357087 A1 * | 12/2018 | Qian | G06N 5/022 |
| 2019/0149429 A1 * | 5/2019 | Stocker | H04L 67/104 |
| 2019/0287146 A1 * | 9/2019 | Maitland | H04L 41/12 |

FOREIGN PATENT DOCUMENTS

| | | |
|---|---|---|
| WO | 2016118979 A2 | 7/2016 |
| WO | 2017220115 A1 | 12/2017 |
| WO | 2018109598 A1 | 6/2018 |

\* cited by examiner

*Primary Examiner* — Mewale A Ambaye (57) ABSTRACT

In a wireless data network, Radio Access Networks (RANs) exchange user data between User Equipment (UEs) and core networks. The core networks exchange user data between the RANs and external data networks. The core networks transfer core information to distributed ledgers that characterizes the user data exchanges. The distributed ledgers add core data that characterizes core information state changes and store the core information. A data analytics engine filters the core data to detect core information states. The data analytics engine transfers core analytic data associated with the core information states.

16 Claims, 8 Drawing Sheets

WIRELESS DATA NETWORK DISTRIBUTED LEDGER ANALYSIS TO DETECT AND IDENTIFY ANALYTIC INFORMATION

TECHNICAL BACKGROUND

Wireless data networks serve wireless user devices with mobile data services like video streaming, internet access, and voice calling. The wireless data networks have wireless access points that exchange user data over the air with the wireless user devices. The wireless data networks also have Network Function Virtualization Infrastructures (NFVIs) that are directed by Management and Orchestration (MANO) systems. The MANO systems implement Network Service Descriptors (NSDs) to control the NFVIs. The NFVIs execute Virtual Network Functions (VNFs) responsive to the MANO system control. To deliver the wireless data services, the user devices communicate with the access points, and the access points communicate with the VNFs that are running in the NFVIs.

A network slice comprises a virtual portion of the wireless data network. The network slice may be an end-to-end network, core network, access network, or combinations thereof. To form a network slice, a network slice controller instructs the NFV MANO system to implement an NSD for the network slice. The NFV MANO system directs the NFVI to run the VNFs for the network slice based on the NSD. The network slice controller also instructs the wireless access points for the network slice to serve the wireless user devices for the network slice. To deliver wireless data services within the network slice, the user devices in the network slice communicate with the access points in the network slice, and these access points communicate with the VNFs in the network slice that are running in the NFVIs.

A distributed ledger is comprised of data blocks that are copied and executed across multiple computers. Each block has an immutable portion and a dynamic portion. The immutable portions of the ledger blocks interact with one another to reach consensus on new data before storing the new data in the dynamic portion of the ledger. For example, the ledger blocks may reach a consensus on a user's payment amount before storing the payment amount. Various consensus algorithms are available for use by the distributed ledger. The distributed ledger also uses ledger oracles to feed information into the distributed ledger and to read data from distributed ledger. Various ledger oracles are available for use by the distributed ledger as well.

The ability to detect specific changes in the wireless network data that is stored in the distributed ledgers is a challenge. The raw amount of network data is massive as is the quantity of changes to the network data. Moreover, the analysis of changes to this massive amount of network data to detect specific network states is limited. Unfortunately, current wireless data networks do not effectively and efficiently handle the network data stored in the distributed ledgers to detect specific network states.

Technical Overview

In a wireless data network, Radio Access Networks (RANs) exchange user data between User Equipment (UEs) and core networks. The core networks exchange user data between the RANs and external data networks. The core networks transfer core information to distributed ledgers that characterizes the user data exchanges. The distributed ledgers add core data that characterizes core information state changes and store the core information. A data analytics engine filters the core data to detect core information states. The data analytics engine transfers core analytic data associated with the core information states.

DETAILED DESCRIPTION

Figure 1:
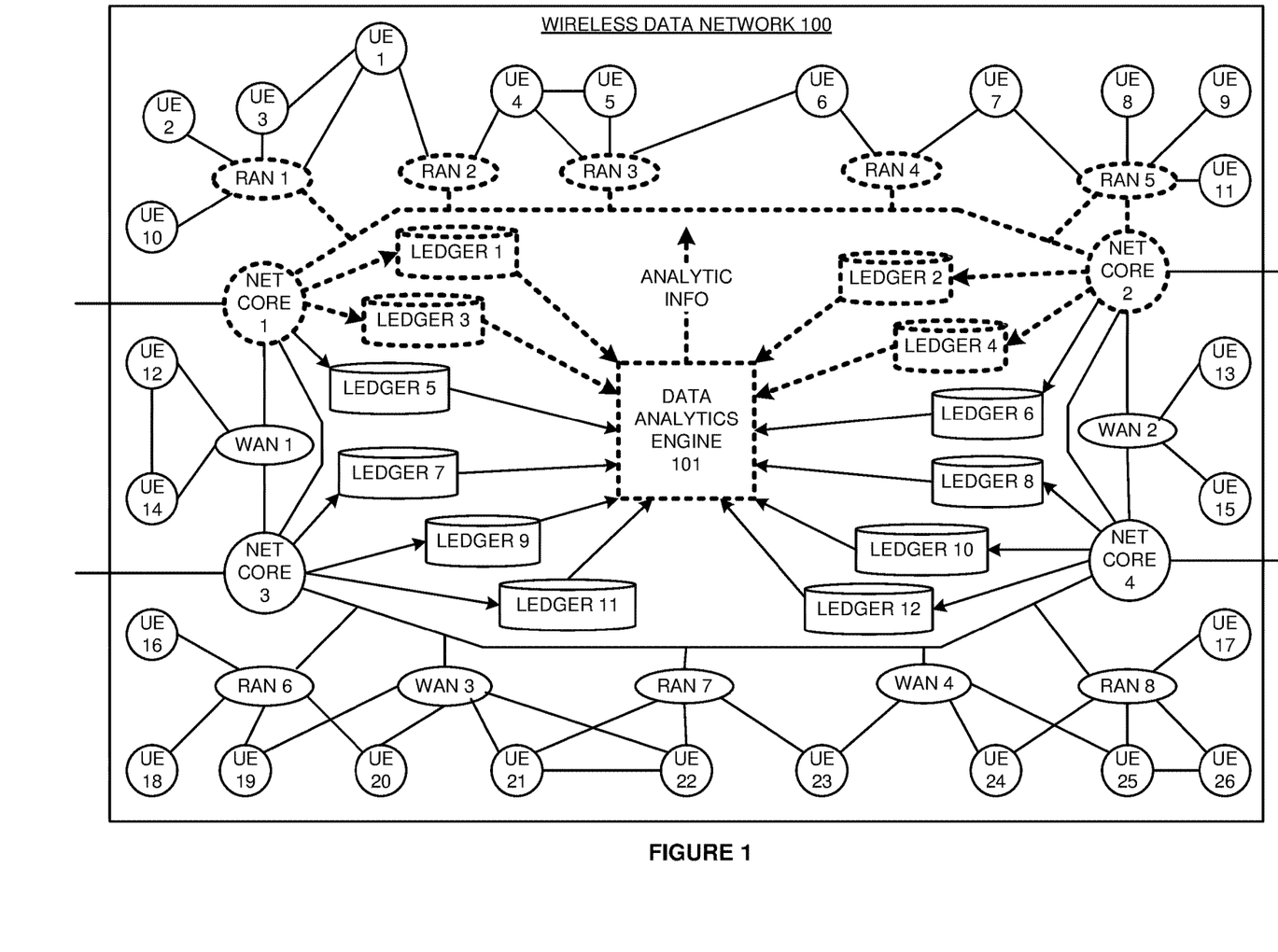
FIG. 1 illustrates a wireless data network that processes distributed ledger data to detect and identify analytic information.

FIG. 1 illustrates wireless data network 100 that processes distributed ledger data to detect and identify analytic information. Wireless data network 100 comprises User Equipment (UEs) 1-26, Radio Access Networks (RANs) 1-8, Wireless Access Networks (WANs) 1-4, network cores 1-4, ledgers 1-12, and data analytics engine 101. The number of UEs, RANs, WANs, network cores, ledgers, and engines is typically far higher but has been restricted for clarity. UEs 1-26 are coupled to RANs 1-8, WANs 1-4, and one another. RANs 1-8 and WANs 1-4 are coupled to network cores 1-4 and one another. Network cores 1-4 are coupled to external data systems and one another. Network cores 1-4 are coupled to ledgers 1-12. Ledgers 1-12 are coupled to data analytics engine 101. This specific architecture is exemplary and different connections may be used between the UEs, RANs, WANs, core networks, ledgers, and engine.

UEs 1-26 comprise computers, phones, headsets, graphic displays, vehicles, drones, sensors, or some other user communication apparatus. Although many UEs are both wireless and landline capable, some UEs may only be wireless capable or landline capable. UEs 1-26 comprise wireless transceiver circuitry and baseband circuitry. The wireless transceiver circuitry comprises antennas, modulators, amplifiers, filters, digital/analog interfaces, Digital Signal Processors (DSPs), memory circuitry, firmware/software, and bus circuitry. The transceiver circuitry uses wireless network protocols like Fifth Generation New Radio (5GNR), Long Term Evolution (LTE), and Institute of Electrical and Electronic Engineers 802.11 (WIFI). The baseband circuitry comprises processing circuitry, memory circuitry, software, bus circuitry, and transceiver circuitry. The software includes an operating system and modules for Physical Layer (PHY), Media Access Control (MAC), Radio Link Control (RLC), Packet Data Convergence Protocol (PDCP), Radio Resource Control (RRC), Service Data Application Protocol (SDAP), and the like. The software may also include applications for network slice control and oracle access.

Network cores 1-4 comprise Network Function Virtualization Infrastructure (NFVI) hardware that hosts Network Function Virtualization (NFV) virtualization layer software, Management and Orchestration (MANO) software, Virtual Network Function (VNF) software, oracle gateway software, and slice controller software. The NFVI hardware comprises processing circuitry, memory circuitry, software, bus circuitry, and transceiver circuitry. The transceiver circuitry comprises computer Input/Output (I/O) ports, memory, and DSPs. The processing circuitry comprises Central Processing Units (CPUs), Graphics Processing Units (GPUs), Application Specific Integrated Circuits (ASICs), and the like. The memory circuitry comprises volatile and non-volatile data storage like Random Access Memory (RAM), cache memory, flash drives, disk drives and the like. The memory circuitry stores. The processing circuitry executes the NFV virtual layer, VNFs, MANO, oracle gateway, and slice controller. The NFV virtual layer comprises operating systems, hypervisors, virtual Switches (vSW), virtual machines, NFV MANO interfaces, and the like. The NFV VNFs comprise network functions like Access and Mobility Management Functions (AMF), Authentication Server Function (AUSF), Unified Data Management (UDM), Policy Control Function (PCF), Session Management Function (SMF), Application Function (AF), Mobility Management Entity (MME), Home Subscriber System (HSS), Serving Gateway (S-GW), Packet Data Network Gateway (P-GW), Policy Charging Rules Function (PCRF), Internet Protocol Multimedia Subsystem (IMS), routers, oracle gateways, applications servers, firewalls, and possibly other networking modules.

RANs 1-8 comprise wireless transceiver circuitry and baseband circuitry. The wireless transceiver circuitry comprises antennas, modulators, amplifiers, filters, digital/analog interfaces, DSPs, memory circuitry, firmware/software, and bus circuitry. The wireless transceiver circuitry uses wireless network protocols like 5GNR, LTE, and WIFI. The baseband circuitry comprises processing circuitry, memory circuitry, software, bus circuitry, and network transceiver circuitry. The network transceiver circuitry comprises amplifiers, filters, digital/analog interfaces, DSPs, memory circuitry, firmware/software, and bus circuitry. The network transceiver circuitry uses landline network protocols like IEEE 802.3 (Ethernet), Internet Protocol (IP), Data over Cable System Interface Specification (DOCSIS), Time Division Multiplex (TDM), Wave Division Multiplex (WDM), Synchronous Optical Network (SONET), and the like. The software includes an operating system and modules for the PHY, MAC, RLC, PDCP, RRC, SDAP, and the like. The software may also applications and/or VNFs for network slice control and network oracle access. In some examples, portions of RANs 1-8 comprise NFVI hardware that hosts NFV virtualization layer software, slice control software, MANO software, and VNF software (PHY, MAC, RLC, PDCP, RRC, SDAP, and oracle gateway).

WANs 1-4 comprise network transceiver circuitry and computer circuitry. The network transceiver circuitry comprises amplifiers, filters, digital/analog interfaces, DSPs, memory circuitry, firmware/software, and bus circuitry. The network transceiver circuitry uses landline network protocols like Ethernet, IP, DOCSIS, TDM, WDM, SONET, and the like. The computer circuitry comprises processing circuitry, memory circuitry, software, bus circuitry, and network transceiver circuitry. The software includes an operating system and modules for the routers, firewalls, application servers, and the like. The software may also include modules for network slice control and network oracle access.

Ledgers 1-12 comprise computer systems and software. The computer systems comprise processing circuitry, memory circuitry, software, bus circuitry, and transceiver circuitry. The transceiver circuitry comprises computer I/O ports, memory, and DSPs. The processing circuitry comprises CPUs, GPUs, ASICs, and the like. The memory circuitry comprises volatile and non-volatile data storage like RAM, cache memory, flash drives, disk drives and the like. The software is stored in the memory circuitry and is executed by the processing circuitry. The software comprises operating systems, oracle software, and ledger block software. The ledger block software comprises an oracle interface, block interface, block application, and ledger database. In some examples, network cores 1-4 host at least some of ledgers 1-12 and/or data analytics engine 101. In some examples, at least some of ledgers 1-12 comprise VNFs.

Data analytics engine 101 stores target instructions that include filter criteria, processing logic, and thresholds to detect various state changes and identify corresponding analytic information. Data analytics engine 101 distributes some of the target instructions to ledgers 1-12 which also detect and indicate various state changes. Data analytics engine 101 comprises a computer system and software. The computer system comprises processing circuitry, memory circuitry, software, bus circuitry, and transceiver circuitry. The transceiver circuitry comprises computer I/O ports, memory, and DSPs. The processing circuitry comprises CPUs, GPUs, ASICs, and the like. The memory circuitry comprises volatile and non-volatile data storage like RAM, cache memory, flash drives, disk drives and the like. The software is stored in the memory circuitry and is executed by the processing circuitry. The software comprises operating systems, oracle interface, and application software. In some examples, network cores 1-4 host at least a portion of data analytics engine 101. In some examples, at least a portion of data analytics engine 101 comprise VNFs (filters, applications, user interfaces).

In operation, RANs 1-12 and UEs 1-11 and 16-26 wirelessly exchange user data. WANs 1-4 and UEs 12-15, 19-25 exchange user data. RANs 1-8 and WANs 1-4 exchange user data among themselves and exchange user data with core networks 1-4. Core networks 1-4 exchange user data among themselves and exchange user data with external data networks. Core networks 1-4 transfer core information that characterizes the user data exchanges to distributed ledgers 1-12. The core information may comprise data transfer amounts, times, locations, end-points, quality, network slices, and the like.

Distributed ledgers 1-12 compare new core information to stored core information to detect state changes to the core information. Advantageously, distributed ledgers 1-12 generate core data that characterizes the core information state changes. Distributed ledgers 1-12 store the core information and the core data. Distributed ledgers 1-12 filter the core data and transfer the filtered core data. In some examples, RANs 1-8 transfer RAN information that characterizes the user data exchanges to core networks 1-4, and core networks 1-4 transfer the RAN information to distributed ledgers 1-12. Distributed ledgers 1-12 compare new RAN information to stored RAN information to detect state changes to the RAN information. Advantageously, distributed ledgers 1-12 generate RAN data that characterizes the RAN information state changes. Distributed ledgers 1-12 store the RAN information and the RAN data. Distributed ledgers 1-12 filter the RAN data and transfer the filtered RAN data.

In some examples, UEs 1-26 transfer UE information over the RAN/WANs to core networks 1-4, and core networks 1-4 transfer the UE information to distributed ledgers 1-12. The UE information may characterize the user data exchanges and may also include sensor data, user inputs, processing outputs, and the like. Distributed ledgers 1-12 compare new UE information to stored UE information to detect state changes to the core information. Advantageously, distributed ledgers 1-12 generate UE data that characterizes the UE information state changes. Distributed ledgers 1-12 store the UE information and the UE data. Distributed ledgers 1-12 filter the UE data and transfer the filtered UE data.

Distributed ledgers 1-12 generate data blocks that are copied and executed across multiple ledger computers in parallel. In the ledger computers, the ledger blocks have an immutable portion and a dynamic portion. The immutable portion of the ledger blocks comprise ledger block applications that execute in parallel and reach consensus on new data inputs and new data outputs before storing new data in the ledger database or transferring the new data outputs—including state change data. Various consensus algorithms are available and may be used.

Data analytics engine 101 has data filters that logically compares the state change data with filter criteria, processing logic, and thresholds that are associated with specific target states. Data analytics engine 101 filters the core data, RAN data, and UE data to detect the analytic information state changes and their corresponding analytic information. The state changes may be for a UE, RAN, WAN, network core, wireless data network, network slice, user service, and the like. For example, data analytics engine 101 may filter the core data, RAN data, and UE data to detect a mobile drone collision by detecting that drone UEs 8-9 have gone quiet at the same geographic location at the same time, where the location is not a home location for either drone. In another example, data analytics engine 101 may filter the data to locate a gunshot by correlating multiple gunshot reports from RANs 4-5 and UEs 6-11. Data analytics engine 101 transfers analytic data that indicates the analytic information. Advantageously, data analytics engine 101 continually processes ledger block state changes to detect and report on various target states.

A network slice comprises a portion of wireless data network 100 that serves a particular purpose and/or user group. Network slices typically share wireless data network hardware and virtual layer software although these could be dedicated to the slice in some examples. A network slice typically has its own VNFs although some VNFs may be shared among slices. To establish a network slice, a slice controller directs a MANO system to control the NFV virtual layer to drive the NFV hardware to execute the VNFs for the slice. In some examples, the network slice may also include portions of RANs 1-8, WANs 1-4, UEs 1-26, ledgers 1-12, and/or data analytics engine 101. The slice controller then configures and directs the RANs, WANs, UEs, ledgers, and/or engines that form part of the given network slice.

On FIG. 1, an exemplary network slice is depicted by the dotted lines and comprises RANs 1-5, network cores 1-2, ledgers 1-4, and data analytics engine 101. For a wireless data network slice, the network slice controller directs the creation, operation, and termination of the slice based on a slice configuration. The slice configuration indicates a Network Service Descriptor (NSD) that details the VNFs, Virtual Links (VLs), Physical Network Functions (PNFs), PNF Forwarding Graphs (PNFFGs), and VNF Forwarding Graphs (VNFFGs) for the slice. The slice configuration indicates any UEs, RANs, WANs, ledgers, and analytic engines in the network slice. The RANs, WANs, ledgers, and/or analytic engine may comprise VNFs in the NSD. Network slices may be coupled together. For example, a first network slice formed by RANs 1-5 and network cores 1-2 could be coupled to a second network slice formed by ledgers 1-4 and data analytics engine 101.

Figure 2:
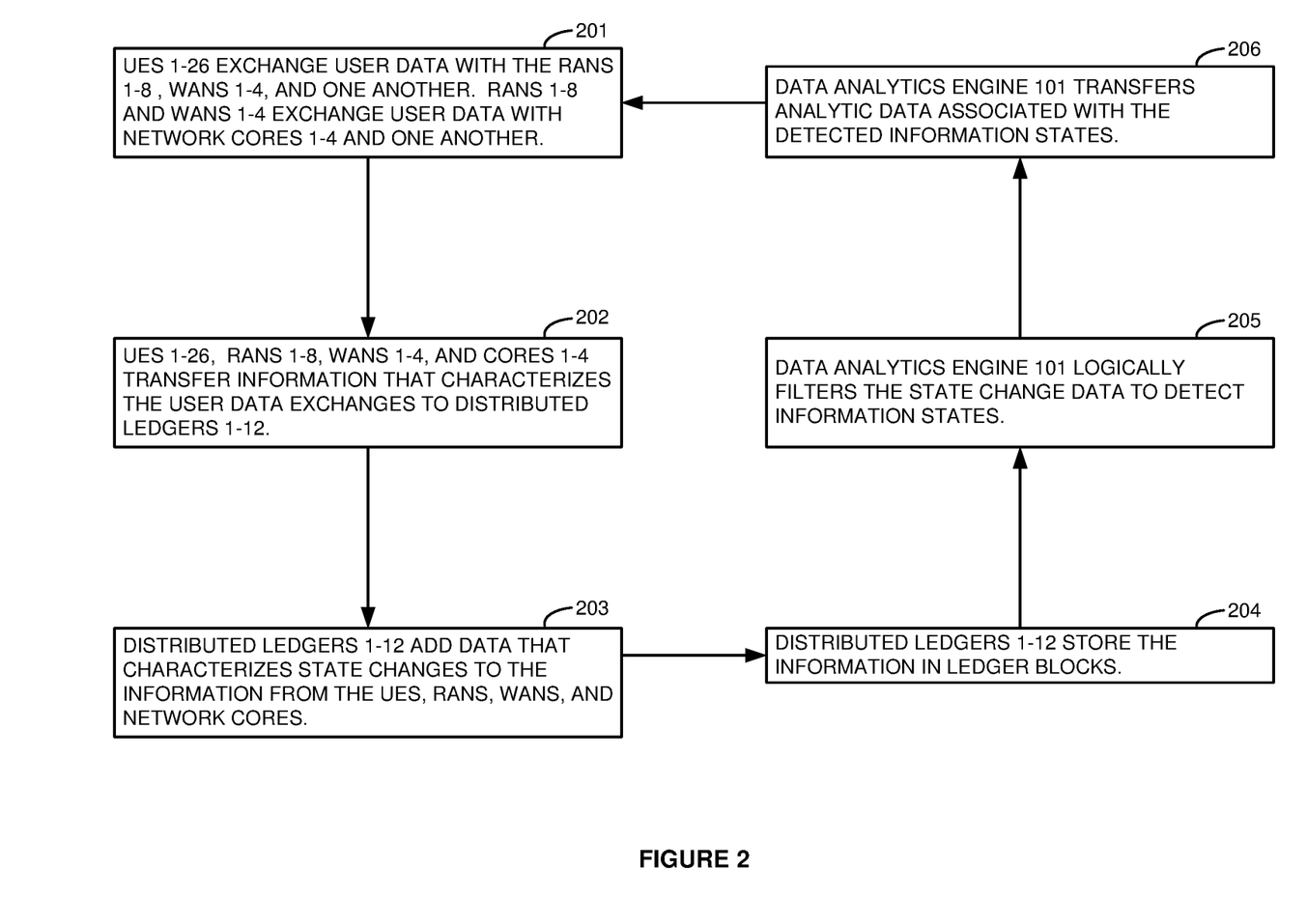
FIG. 2 illustrates the operation of the wireless data network that processes distributed ledger data to detect and identify the analytic information.

FIG. 2 illustrates the operation of wireless data network 100 to generate and analyze distributed ledgers 1-12. In operation, UEs 1-26 exchange user data with RANs 1-8, WANs 1-4, and one another (201). RANs 1-8 and WANs 1-4 exchange user data with network cores 1-4 and one another. UEs 1-26, RANs 1-8, WANs 1-4, and cores 1-4 transfer information that characterizes the user data exchanges to the distributed ledgers 1-12 (202). The UE information may include user information from sensors, user applications, user interfaces, and the like. Advantageously, distributed ledgers 1-12 generate data that characterizes state changes to the information from UEs 1-26, RANs 1-8, WANs 1-4, and network cores 1-4 (203). For example, an oracle in distributed ledger 1 may compare UE locations to detect UE location state changes. The oracle may compare RAN user numbers per location to detect wireless base station state changes. Distributed ledgers 1-12 store the information in ledger blocks (204). The ledger blocks are executed across multiple ledger computers in parallel to reach consensus on new data inputs and new data outputs before storing or transferring the new data. Various consensus algorithms may be used. Data analytics engine 101 logically filters the state change data to detect specifically targeted information state changes and states (205). Various thresholds and logical operators (and, or, XOR, and the like) can be used to detect targeted information state changes. Data analytics engine 101 transfers analytic data associated with the detected information states (206). Advantageously, data analytics engine 101 continually processes a multitude of different state changes to detect and report specifically-targeted states.

Figure 3:
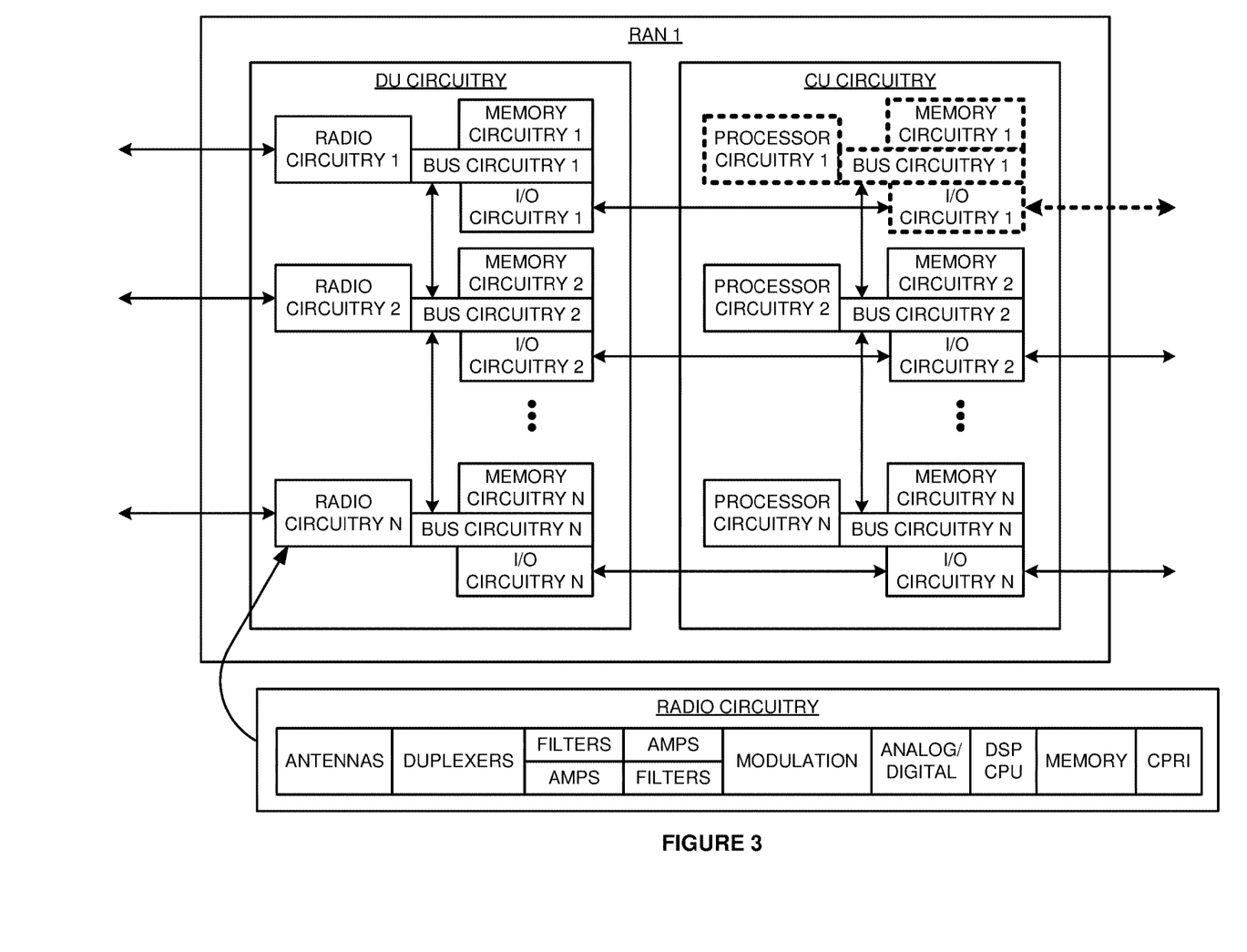
FIG. 3 illustrates a hardware architecture for Radio Access Networks (RANs) in the wireless data network to process distributed ledger data to detect and identify the analytic information.

FIG. 3 illustrates a hardware architecture for Radio Access Network (RAN) 1 in wireless data network 100 to generate and analyze distributed ledgers. The hardware architecture is exemplary and other hardware architectures could be used. The hardware architecture for RAN 1 comprises Distributed Unit (DU) circuitry and Central Unit (CU) circuitry. The DU circuitry comprises radio circuitry 1-N, memory circuitry 1-N, I/O circuitry 1-N, and bus circuitry 1-N. Bus circuitry 1 is coupled together and also couples radio circuitry 1, memory circuitry 1, and I/O circuitry 1. Bus circuitry 2-N, radio circuitry 2-N, memory circuitry 2-N, and I/O circuitry 2-N may be respectively coupled together in a similar manner. I/O circuitry 1 in the DU circuitry is linked to I/O circuitry 1 in the CU circuitry which is linked to I/O circuitry 1 in core circuitry. I/O circuitry 2-N are linked in a similar manner. Radio circuitry 1-N each comprise antennas, duplexers, filters, amplifiers, modulators, analog/digital interfaces, DSPs/CPUs, memory, and typically a radio interface like Common Public Radio Interface (CPRI).

The CU circuitry comprises processing circuitry 1-N, memory circuitry 1-N, I/O circuitry 1-N, and bus circuitry 1-N. Bus circuitry 1 is coupled together and also couples radio circuitry 1, memory circuitry 1, and I/O circuitry 1. Bus circuitry 2-N, processing circuitry 2-N, memory circuitry 2-N, and I/O circuitry 2-N may be respectively coupled together in a similar manner. I/O circuitry 1 in the CU circuitry is linked to I/O circuitry 1 in the DU circuitry and to I/O circuitry 1 in ledger 1.

In radio circuitry 1-N, the memories store DSP firmware and/or software. In the DU circuitry, memory circuitry 1-N stores user data, operating systems, and network applications like PHY, MAC, RLC, PDCP, RRC and SDAP. In the CU circuitry, memory circuitry 1-N stores user data, operating systems, and applications/VNFs for PHY, MAC, RLC, PDCP, RRC, and SDAP. In radio circuitry 1-N, the DSPs execute their firmware/software to drive the exchange of data between the radio circuitry memories and the antennas. In radio circuitry 1-N, the CPUs execute their operating systems and network applications to drive the exchange of data between the radio circuitry memories and CU memory circuitry 1-N. CU processing circuitry 1-N executes their operating systems and apps/VNFs to drive the exchange of data between the CU memory circuitry 1-N and core networks In radio circuitry 1-N of DU circuitry, the antennas receive wireless UL signals from UEs and transfer corresponding electrical UL signals through the duplexers to the amplifiers. The amplifiers boost the UL signals for filters which attenuate unwanted energy. In modulation, demodulators down-convert the UL signals from their carrier frequencies. The analog/digital interfaces convert the analog UL signals into digital UL signals for the DSPs. The DSPs recover UL data and signaling from the UL signals and transfer the recovered UL data and signaling to the memory circuitry. The CPUs execute their OS and network apps/VNFs to process the UL data and signaling. The network apps/VNFs drive the DU circuitry to transfer UL data and signaling from memory circuitry 1-N over I/O circuitry 1-N to I/O transceivers 1-N and then memory circuitry 1-N in the CU circuitry. The CU processing circuitry 1-N executes their OS and apps/VNFs to process the UL data and signaling. The apps/VNFs drive the CU circuitry to transfer UL data and signaling from memory circuitry 1-N over I/O circuitry 1-N to I/O transceivers 1-N and memory circuitry 1-N in the network cores 1-4.

I/O circuitry 1-N in the CU circuitry receives Downlink (DL) data and signaling from network cores 1-N and stores the user data and signaling in memory circuitry 1-N. CU processing circuitry 1-N executes their OS and apps/VNFs to process the DL data and signaling. The apps/VNFs drive the CU circuitry to transfer DL data and signaling from memory circuitry 1-N over I/O circuitry 1-N to I/O transceivers 1-N and memory circuitry 1-N in the DU circuitry. In the DU circuitry, radio circuitry 1-N executes their OS and network applications to process the DL data and signaling. The network applications drive DU circuitry 301 to transfer DL data and signaling from its memory circuitry 1-N over its radio circuitry 1-N to the UEs. To perform this transfer from radio circuitry 1-N, the DSPs retrieve DL data and signaling and transfer corresponding DL signals to the analog/digital interface. The analog/digital interface converts the digital DL signals into analog DL signals for the modulators. The modulators up-convert the DL signals to their carrier frequencies. The amplifiers boost the UL signals for the filters which attenuate unwanted out-of-band energy. The filters transfer the DL signals through the duplexers to the antennas. The electrical DL signals drive the antennas to emit corresponding wireless DL signals to the UEs.

In some examples, the CU memory circuitry stores an oracle gateway app or VNF and a slice control app or VNF. Processing circuitry 1 executes the oracle gateway app/VNF to transfer state information from RAN 1 to oracles that drive distributed ledgers 1-12. As indicated by the dotted lines on FIG. 3, processing circuitry 1, bus circuitry 1, and I/O circuitry 1 in the CU circuitry may form part of a network slice that supports distributed ledger operations and analytics.

Figure 4:
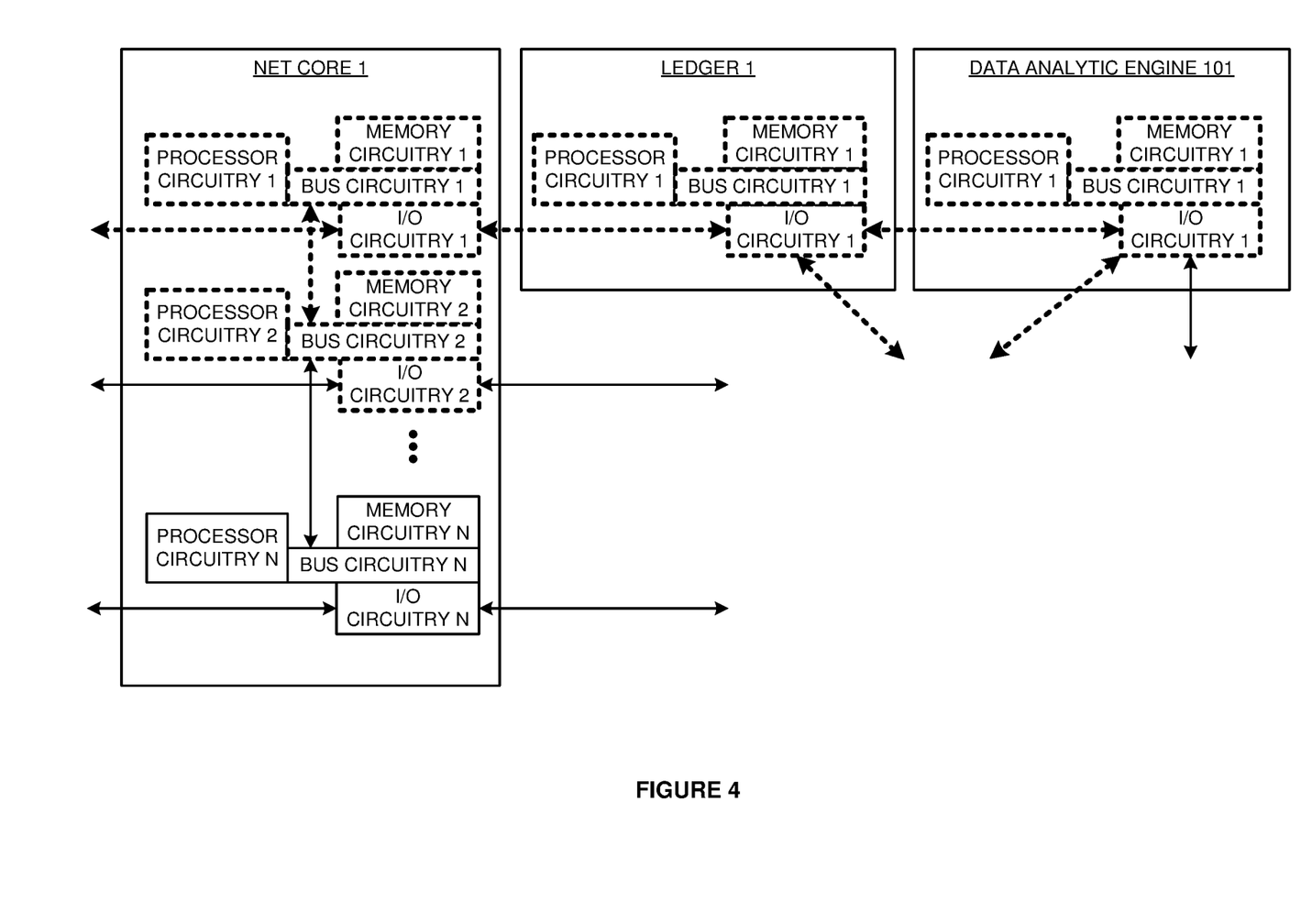
FIG. 4 illustrates a hardware architecture for core networks, distributed ledgers, and an analytic engine in the wireless data network to process distributed ledger data to detect and identify the analytic information.

FIG. 4 illustrates a hardware architecture for network core 1, distributed ledger 1, and analytic engine 101 in wireless data network 100 to generate and analyze distributed ledgers 1-12. The hardware architecture is exemplary and other hardware architectures could be used. Network core 1 comprises processing circuitry 1-N, memory circuitry 1-N, I/O circuitry 1-N, and bus circuitry 1-N. Bus circuitry 1 is coupled together and also couples processing circuitry 1, memory circuitry 1, and I/O circuitry 1. I/O circuitry 1 in the core network 1 is linked to I/O circuitry 1 in ledger 1. Bus circuitry 2-N, processing circuitry 2-N, memory circuitry 2-N, and I/O circuitry 2-N may be respectively coupled together in a similar manner. Memory circuitry 1-N NFV stores virtual layers, VNFs, slice controllers, MANO systems, oracle gateways, and the like. Processing circuitry 1-N executes the NFV virtual layers, VNFs, slice controllers, MANO systems, oracle gateways, and the like to exchange data and signaling with the RANs, WANs, network cores, ledgers 1-12, and external systems over memory circuitry 1-N, bus circuitry 1-N, and I/O circuitry 1-N. The signaling comprises status information from UEs, RANs, and network cores that is stored and filtered in ledgers 1-12.

Ledger 1 comprises processing circuitry 1, memory circuitry 1, I/O circuitry 1, and bus circuitry 1. Bus circuitry 1 couples processing circuitry 1, memory circuitry 1, and I/O circuitry 1. I/O circuitry 1 in ledger 1 is linked to I/O circuitry 1 in network core 1, ledgers 2-12, other ledger 1 computers, other oracle computers, and analytics engine 101. Memory circuitry 1 stores operating systems, oracle applications, distributed ledger applications, filter applications, and application server applications. Processing circuitry 1 executes the operating systems, oracle applications, distributed ledger applications, filter applications, and application server applications. In some examples, these operating systems and applications comprise NFV virtual layers and VNFs for the oracles, distributed ledgers, data filters, and application servers. Ledger 1 exchanges data and signaling with the network cores, other ledgers, and ledger oracles over memory circuitry 1-N, bus circuitry 1-N, and I/O circuitry 1-N. The signaling comprises status information from UEs, RANs, and network cores that is stored and filtered by ledgers 1-12.

Data analytic engine 101 comprises processing circuitry 1, memory circuitry 1, I/O circuitry 1, and bus circuitry 1. Bus circuitry 1 couples processing circuitry 1, memory circuitry 1, and I/O circuitry 1. I/O circuitry 1 in engine 101 is linked to I/O circuitry in ledgers 1-12 and to external user systems that typically include graphical user interfaces. Memory circuitry 1 stores operating systems, filter applications, and server applications. Processing circuitry 1 executes the operating systems, filter applications, and server applications. In some examples, these operating systems and applications comprise NFV virtual layers and VNFs for the data filters and application servers. Data analytic engine 101 exchanges data and signaling with the ledger oracles and external systems over memory circuitry 1-N, bus circuitry 1-N, and I/O circuitry 1-N. The signaling comprises ledger state change information that is detected and transferred by ledgers 1-12. As indicated by the dotted lines on FIG. 4, some of the memory circuitry, processing circuitry, bus circuitry, and I/O circuitry in network core 1, ledger 1, and data analytic engine 101 may form part of a network slice that supports distributed ledger operations and analytics.

Figure 5:
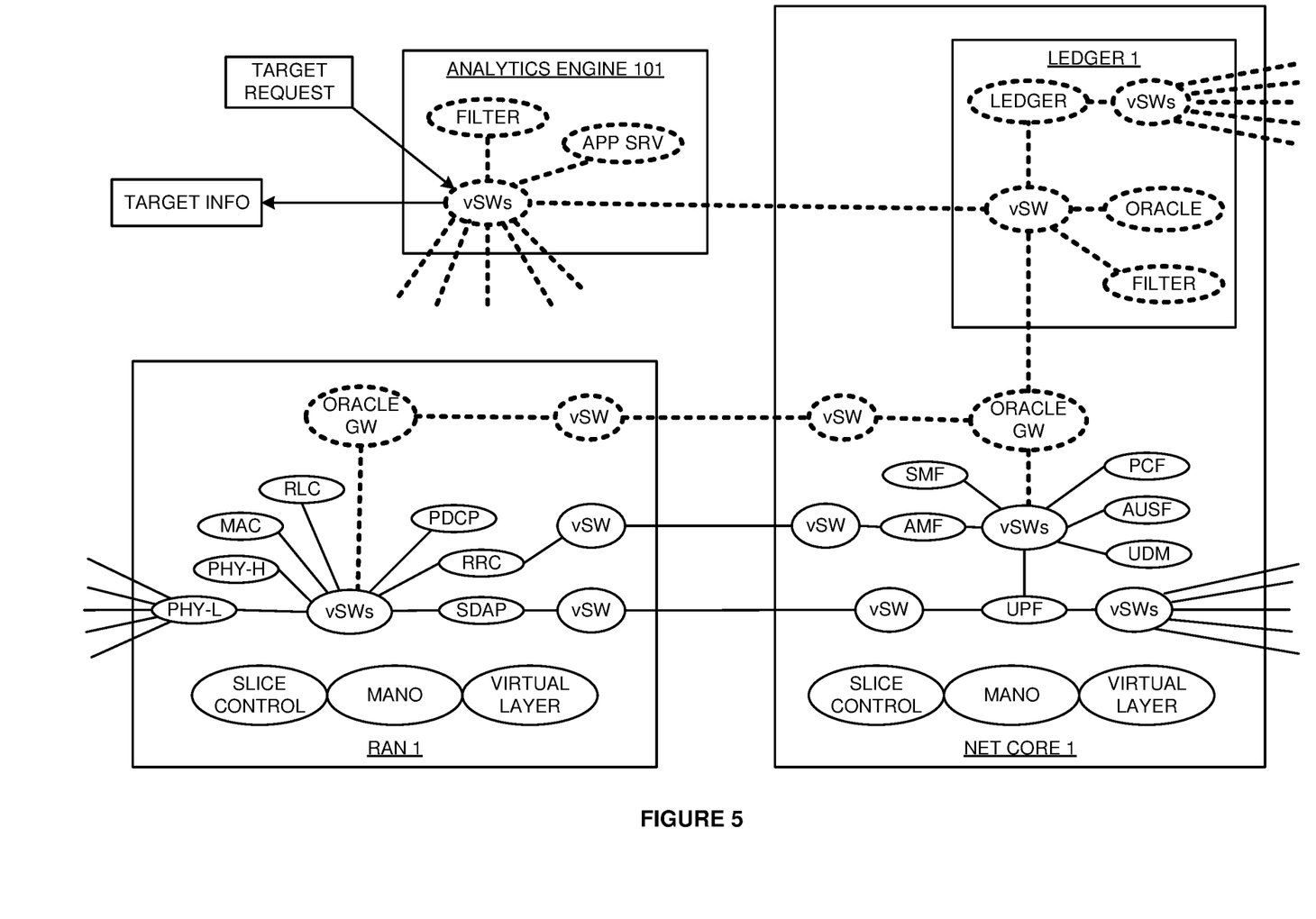
FIG. 5 illustrates a software architecture for the RANs, core networks, distributed ledgers, and analytic engine in the wireless data network to process distributed ledger data to detect and identify the analytic information.

FIG. 5 illustrates a software architecture for RAN 1, core network 1, distributed ledger 1, and analytic engine 101 in wireless data network 100 to generate and analyze distributed ledger 1. The software architecture is exemplary and other software architectures could be used. RAN 1 may comprise a Fifth Generation New Radio (SGNR) network, Long Term Evolution (LTE) network, Institute of Electrical and Electronic Engineer (IEEE) 802.11 (Wifi), or some other wireless communication protocol. In this illustrative example, RAN 1 comprises network applications and VNFs. The network applications comprise PHY-LOW (PHY-L), NFV virtual layer, NFV MANO, and slice controller. The NFV virtual layer comprises operating systems, hypervisors, hardware drivers, virtual machines, vSWs, and perhaps other virtualization modules. The vSWs are shown externally to the virtual layer for clarity. The VNFs comprise PHY-HIGH (PHY-H), MAC, RLC, PDCP, RRC, SDAP, oracle gateways, and the like. One or more vSWs couple these VNFs, and vSWs couple the RRC VNFs, SDAP VNFs, and oracle gateway VNFs to network core 1.

Network core 1 may comprise a 5G core, LTE core, or some other wireless networking center. In this illustrative example, network core 1 comprises network applications and VNFs. The network applications comprise NFV virtual layer, NFV MANO, and slice controller. The NFV virtual layer comprises operating systems, hypervisors, hardware drivers, virtual machines, vSWs, and perhaps other virtualization modules. The vSWs that are shown externally to the virtual layer for clarity. One or more vSWs couple VNFs like AMF, SMF, UPF, PCF, AUSF, UDM, oracle gateway, oracle, and ledger. In network core 1, vSWs couple AMF VNFs to RAN RRC VNFs and couple UPF VNFs to RAN SDAP VNFs. In core 1, vSWs couple the UPF VNFs to external systems. The vSWs couple the oracle gateway VNFs in RAN 1 to the oracle gateway VNFs in core 1. In network core 1, vSWs couple the oracle gateway VNFs, data filter VNFs, oracle VNFs, and analytics engine 101. The vSWs also couple the ledger VNFs to the oracle VNFs and to other ledger VNFs (that are in other computers for ledger 1). In analytics engine 101, the vSWs couple data filter VNFs and application server VNFs to data filter VNFs in network core 1 and other network cores.

In RAN 1, the PHY-L network applications wirelessly exchange network signaling and user data with various UEs. The PHY-L applications perform lower PHY functions like packet formation/deformation, windowing/de-windowing, guard-insertion/guard-deletion, and Fast Fourier Transforms (FFTs)/Inverse FFTs (IFFTs), data mapping/de-mapping, interleaving/de-interleaving, parsing/de-parsing, Forward Error Correction (FEC) encoding/decoding, control insertion/removal, Resource Element (RE) mapping/de-mapping, precoding, layer mapping/de-mapping, modulation mapping/de-mapping, channel estimation, channel equalization, and Inverse Discrete Fourier Transforms (IDFT).

The PHY-L applications exchange network signaling and user data with the PHY-H VNFs. The PHY-H VNFs perform tasks like scrambling/descrambling, FEC encoding/decoding, parsing/de-parsing, interleaving/de-interleaving, data mapping/de-mapping, channel coding/decoding, rate matching/de-matching, modulation mapping/de-mapping, layer mapping/de-mapping, IDFT, channel estimation, channel equalization, precoding, and RE mapping/de-mapping. The MAC VNFs process user data to map between the MAC transport channels and MAC logical channels. The MAC VNFs determine buffer status, power headroom, channel quality, Hybrid Automatic Repeat Request (HARQ) acknowledgements, UE identifiers, and the like. To perform HARQ on the UL, the MAC VNFs transfer ACKs for UL data and signaling. To perform random access, the MAC VNFs process access signaling to identify UEs and initiate scheduling. To perform power control, the MAC VNFs process channel quality and power headroom to adjust user power to overcome poor channel quality within headroom and interference limits. To perform scheduling, the MAC VNFs process radio channel quality, buffer status, and radio interference to assign data and signaling to wireless payloads. The MAC VNFs signal the schedule to the UEs. The MAC VNFs process performance data like data-rate, delay, error-rate, and jitter to maintain Quality-of-Service (QoS) for the user devices.

The RLC VNFs map between the MAC logical channels and Protocol Data Units (PDUs). The RLC VNFs perform ARQ for the UL data and signaling by transferring UL ACKs. The RLC VNFs perform ARQ for the DL by retransmitting DL data and signaling that was not properly received. The RLC VNFs add sequence numbers on the DL and perform resequencing on the UL. The RLC VNFs perform segmentation and resegmentation. The RLC VFs exchange data and signaling with the PDCP VNFs. The PDCP VNFs map between the PDUs from the RLC and Service Data Units (SDUs) for the RRC/SDAP VNFs. The PDCP VNFs handle security by applying ciphering. The PDCP VNFs perform header compression and decompression. The PDCP VNFs add sequence numbers and re-orders received SDUs in their proper sequence. The PDCP VNFs eliminate duplicate UL data. The RRC VNFs exchanges SDUs that carry signaling and with the PDCP VNFs.

The RRC VNFs interact with the AMF VNFs to establish and terminate data sessions. The RRC VNFs supports messaging between AMFs and the UEs. The RRC VNFs direct the broadcast of system information to the UEs. The RRC VNFs transfer paging to the UEs. The RRC VNFs handle security and key management. The RRC VNFs handle handover operations. The RRC VNFs manage UE reporting and QoS. The SDAP VNFs exchange SDUs that carry user data with the PDCP VNFs. The SDAP VNFs exchange user data with the UPF VNFs over vSWs. The UPF VNFs exchange the data with other systems under the control of the SMF. The SDAP VNFs map between the SDUs and QoS flows. The SDAP VNFs mark the QoS flows with the proper QoS.

In network core 1, the AMF VNFs exchange signaling with the RRC VNFs over the vSWs. The UPF VNFs exchange data with the SDAP VNFs over the vSWs. The UPF VNFs exchange data with network cores 2-4 and external systems over the vSWs. The SMF VNFs control UPF VNF sessions. The AMF and SMF VNFs access the PCF, AUSF, and UDM VNFs for policy, authorization, and content.

In RAN 1, the oracle gateway VNFs are coupled over vSWs to RAN VNFs and applications like PHY, MAC, RLC, PDCP, RRC, SDAP, slice controller, MANO, and virtual layer. The RAN VNFs and applications transfer their status data to the RAN oracle gateway over the vSWs, and the RAN oracle gateway aggregates and transfers the RAN status data to network core 1 for processing and storage in ledger 1.

In network core 1, the oracle gateway VNFs receive RAN status information over the vSWs from the oracle gateway VNFs in RAN 1. In core 1, the oracle gateway VNFs are coupled over vSWs to core VNFs and applications like AMF, SMF, PCF, AUSF, UDM, slice controller, MANO, and virtual layer. The core VNFs and applications transfer their status data to the oracle gateway VNFs in core 1 over the vSWs. These oracle gateway VNFs aggregate and transfer the RAN status data and the core status data to the oracle VNFs in ledger 1. The oracle VNFs authorize and transfer the wireless network status data to the ledger VNFs. The ledger VNFs process the status data and exchange signaling with other ledger VNFs in ledger 1 (in other ledger 1 computers) to reach consensus on the new status data. The ledger VNFs store the status data in ledger 1 when consensus is reached.

The oracle VNFs process the wireless network status data to detect wireless network state changes from the previous set of wireless network status data. The oracle VNFs transfer the detected wireless network state changes to the data filter VNFs over the vSWs. The data filter VNFs apply stored filter criteria from the target request to select and forward a portion of the state changes over the vSWs to the data filter VNFs in analytics engine 101.

Although analytics engine 101 is shown externally to network core 1, analytics engine 101 may be integrated within network core 1 if desired. In analytics engine 101, the application server VNFs receive target requests that associate one or more target states with corresponding analytic information. The target requests indicate the processing logic and thresholds that detect the target states. The processing logic and thresholds comprise: and, or, xor, sum, scale, >, <, =, and the like. The application server VNFs load filter criteria into the data filter VNFs in ledger 1 and analytics engine 101. The application server VNFs also store and apply some of the processing logic and thresholds.

In analytics engine 101, the data filter VNFs receive the filtered status changes from cores 1-4 over the vSWs. The data filter VNFs applies the filter criteria from the target requests to select and forward select state changes to the application server VNFs over the vSWs. The application server VNFs process the filtered wireless network state changes (from cores 1-4) based on stored logic from the target instructions to detect the specific target states and their associated analytic information. The application server VNFs transfer the detected analytic information over the vSWs.

For example, a target request for road damage may indicate vehicle and location status changes for vehicle UEs along with the logic/thresholds to correlate excessively-common locations for damaged vehicles. The UEs and RANs report UE damage and UE location. The data filter VNFs detect the UE damage and location state changes. The application server VNFs process the filtered damage and location data to detect common locations for the damaged vehicles. When a specific location for damaged vehicles exceeds a damaged vehicle threshold within a time interval, then the application server VNFs transfer target data that indicates road damage at the location.

In operation, RAN 1 wirelessly exchanges user data with UEs. RAN 1 exchanges user data with other RANs and network cores 1-2. Network cores 1-2 exchange the user data with external data networks. The UEs, RANs, network cores transfer status information that characterizes the user data exchanges and other information to distributed ledger 1. The ledger VNFs for ledger 1 achieve consensus and store the information across multiple computers. Advantageously, the oracle VNFs and/or the ledger VNFs add metadata that characterizes state changes to this stored information.

For ledger 1, the ledger VNFs generate data blocks that are copied and executed in parallel across all ledger 1 computers. In each of these computers, each ledger block has an immutable data portion and a dynamic data portion. The immutable portion of the a ledger block comprises ledger block applications and/or VNFs that execute in parallel with one another to: receive and distribute new data inputs, reach consensus across ledger computers for the new data, process the new data to generate new data outputs (including state change data), and store the new data inputs, outputs, and state changes and in the ledger database format. In ledger 1, the data filter VNFs filter and logically process the state change data against the filter criteria.

Data analytics engine 101 also filters that logically compares state change data from cores 1-4 which was typically pre-filtered in the core and perhaps the RAN. The application server VNFs in data analytics engine 101 process the filtered state change data with processing logic and thresholds to detect specific state changes and their targeted information. The state changes may be for a wireless data network, network core, RAN, WAN, UE, network slice, user service, and the like. For example, data analytics engine 101 may filter the state change data from a RAN and core to detect a mobile drone collision by detecting that drone UEs 8-9 have gone quiet at the same geographic location and time where the location/time are not a home location/time for either drone. In another example, data analytics engine 101 may filter the data to locate a gunshot by correlating ambient noise reports from RANs 4-5 and UEs 6-11. Data analytics engine 101 indicates the targeted information. Advantageously, data analytics engine 101 continually processes ledger block state changes to detect and report on various targeted situations.

An exemplary network slice for the ledger analytics is indicated on FIG. 5 by dotted lines. This network slice has virtual links, vSWs, and VNFs. The VNFs include the oracle gateways, oracles, data filters, ledgers, and application servers. To establish the analytical ledger network slice, a slice controller directs a MANO system to control the NFV virtual layer to drive the NFV hardware to execute the VNFs, virtual links, and vSWs for the ledger/analytics slice. In other examples, the network slice may also include other VNFs and vSWs in core networks 1-4, RANs 1-8, WANs 1-4, and UEs 1-28. The target request effectively drives the ledger network slice to collect, store, detect, and report target states and corresponding analytic information.

Figure 6:
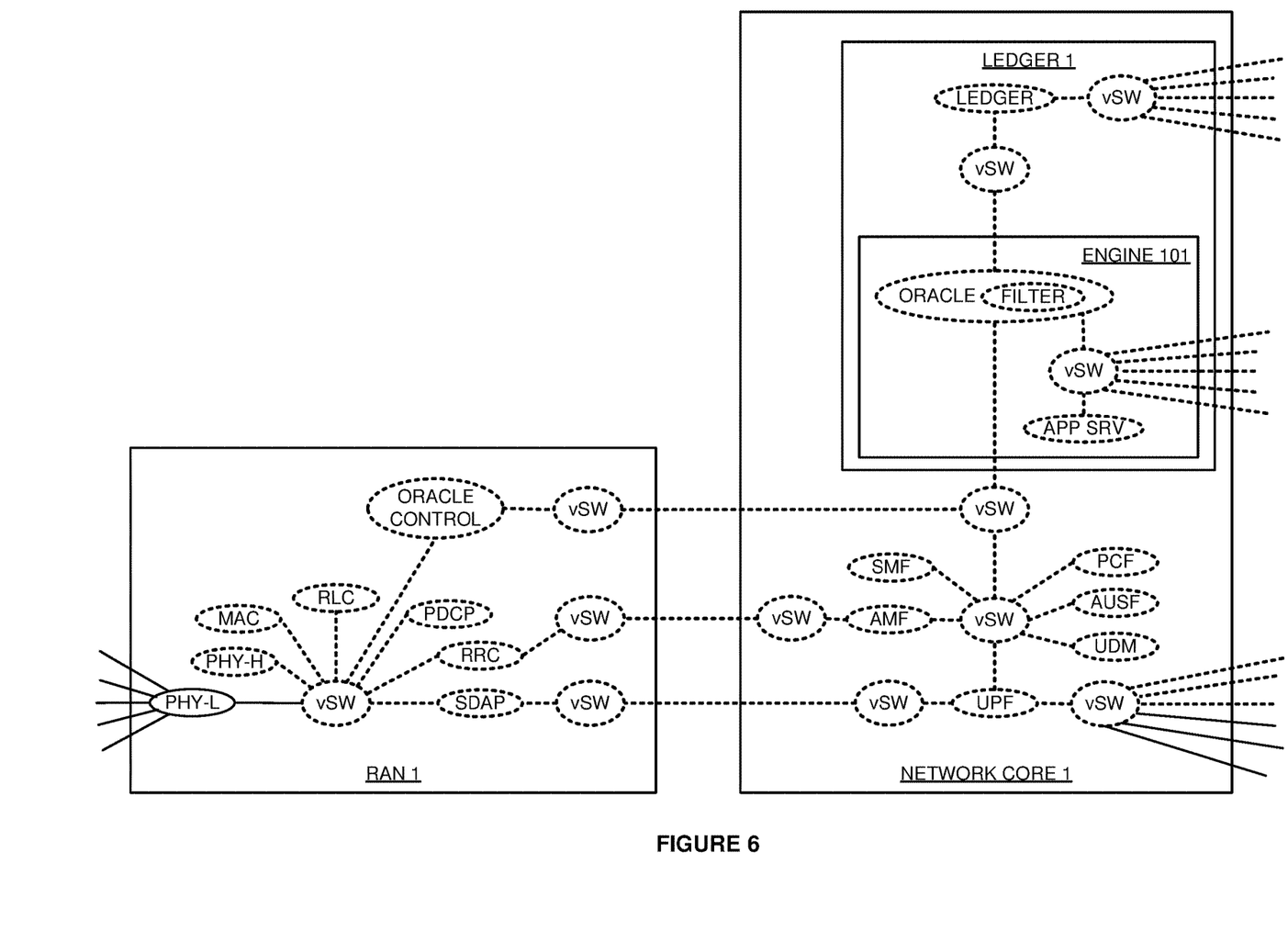
FIG. 6 illustrates another software architecture for the RANs, core networks, distributed ledgers, and analytic engine in the wireless data network to process distributed ledger data to detect and identify the analytic information.

FIG. 6 illustrates another software architecture for RAN 1, core network 1, distributed ledger 1, and analytic engine 101 in wireless data network 100 to generate and analyze distributed ledger 1. The software architecture is exemplary and other software architectures could be used. In network core 1, ledger 1 incorporates data analytics engine 101. Data analytics engine 101 has application server VNFs that receive target requests that indicate state changes along with their analytic information, processing logic, and thresholds. Data analytics engine 101 has oracle VNFs that feed new status data to the ledger VNFs.

In data analytics engine 101, the oracle VNFs determine state changes responsive to new input data and filter these state change data based on the target filter criteria from the application server VNFs. The oracle VNFs also receive new data outputs from the ledger VNFs responsive to ledger block execution. The oracle VNFs determine state changes based on the output data and then filter these state change data based on the target filter criteria from the application server VNFs. Data analytics engine 101 filters and processes state change data to detect specific state changes and their analytic information An exemplary network slice is represented on FIG. 6 by the dotted lines. This network slice has virtual links, vSWs, and VNFs. The VNFs include the PHY-H, MAC, RLC, PDCP RRC, SDAP, AMF, SMF, UPF, PCF, AUSF, UDM, oracle gateways, oracles, data filters, ledgers, and application servers. To establish the network slice, a slice controller directs a MANO system to control the NFV virtual layer to drive the NFV hardware to execute the virtual links, VNFs, and vSWs for the network slice as indicated and described above.

Figure 7:
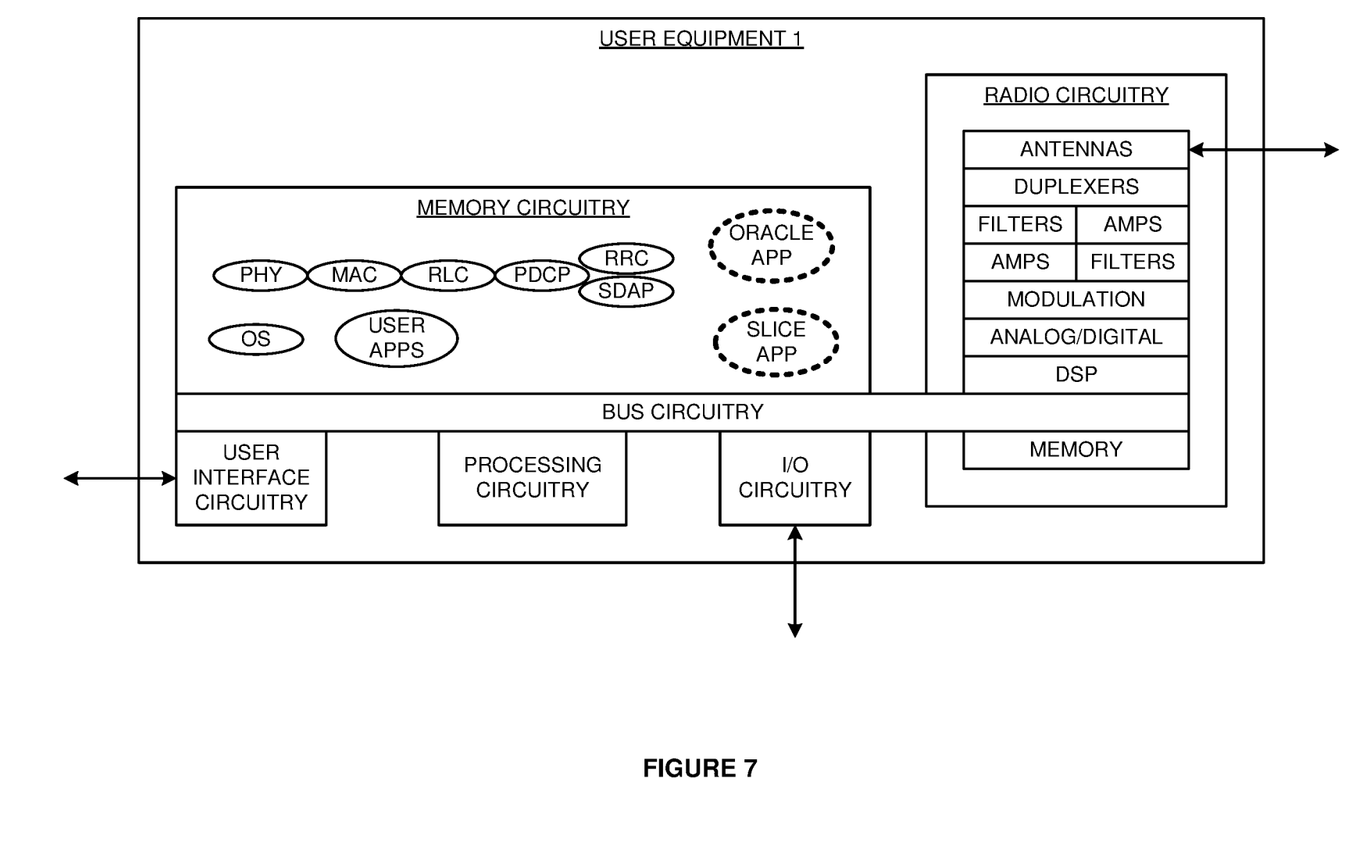
FIG. 7 illustrates User Equipment (UEs) in the wireless data network that processes distributed ledger data to detect and identify the analytic information.

FIG. 7 illustrates a hardware/software architecture for User Equipment (UE) 1 in wireless data network 100 that generates and processes distributed ledger data 1-12. The other UEs could be configured and operate in a similar manner. The architecture is exemplary and other architectures could be used. UE 1 comprises radio circuitry, memory circuitry, I/O circuitry, bus circuitry, processing circuitry, and user interface circuitry. The bus circuitry couples the radio circuitry, memory circuitry, I/O circuitry, processing circuitry and user interface circuitry. The radio circuitry comprises antennas, duplexers, filters, amplifiers, modulation, analog/digital interfaces, DSPs, memory, and typically other components. The memory circuitry stores user data, operating systems, user applications, and network applications like PHY, MAC, RLC, PDCP, RRC, SDAP, oracle interface, and slice control.

In the radio circuitry, the antennas wirelessly exchange data and signaling with the RANs. The DSP executes firmware/software from the radio memory to drive the exchange of data between the radio memory and the antennas. In the processing circuitry, a CPU, GPU, ASIC, and/or some other circuitry executes the operating system and network applications to drive the exchange of data between the radio memory and the memory circuitry in UE 1. The processing circuitry executes the network applications to drive the exchange of data between the memory circuitry and the user interface circuitry, I/O circuitry, and/or radio memory. The user interface circuitry receives or presents the user data. The I/O circuitry exchanges user data with the WANs.

In the radio circuitry, the antennas receive wireless DL signals from the RANs and transfer corresponding electrical DL signals through the duplexers to the amplifiers. The amplifiers boost the DL signals for filters which attenuate unwanted energy. In modulation, demodulators down-convert the DL signals from their carrier frequencies. The analog/digital interfaces convert the analog DL signals into digital DL signals for the DSPs. The DSPs recover DL data and signaling from the DL signals and transfer the recovered DL data and signaling to the memory circuitry. The processing circuitry executes the OS and network applications to process the DL data and signaling and to transfer the DL data to memory circuitry for consumption by the user applications, user interface circuitry, I/O circuitry, and/or memory circuitry. The processing circuitry executes the OS and user applications to generate user data or receive user data from the I/O circuitry or user interface circuitry. The processing circuitry executes the OS and network applications to generate UL data and signaling. The DSP executes its software and firmware to transfer the UL data and signaling to antennas. The antennas wirelessly transmit the user data and signaling to the RANs.

The processing circuitry executes the network slice application to interact with network slice controllers for device provisioning and service control. The processing circuitry executes the network slice application to receive instructions for a user interface, network access and communications, sensor data generation, oracle data transfers, and the like. For example, a medical UE may sense medical data from a proximate human user and transfer the medical data to a medical oracle for storage in a medical ledger. In these examples, data analytical engine 101 might be used to target and detect a medically-significant human population having sudden temperatures spikes within a common time and place like a school or office. The processing circuitry executes the oracle application to transfer UE data to network slice oracles for network slice ledgers and analytical engines.

Figure 8:
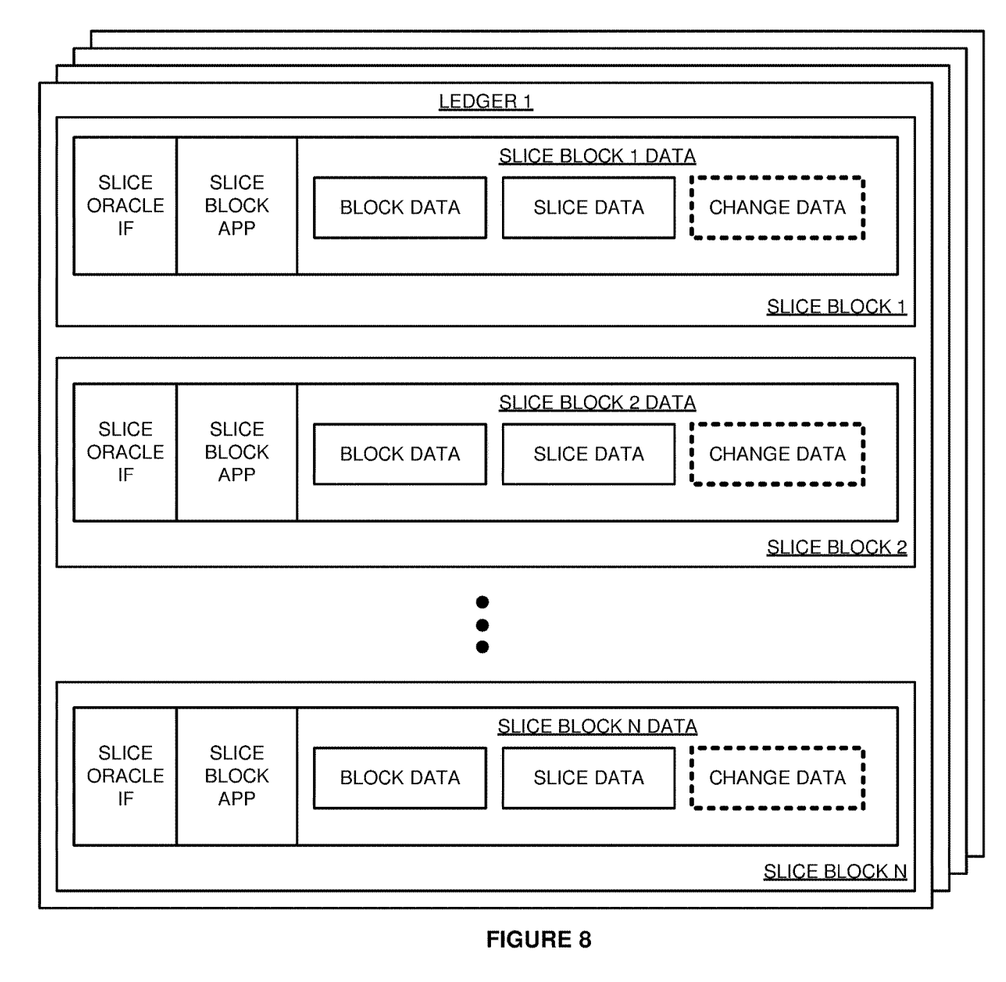
FIG. 8 illustrates ledger blocks for the wireless data network that processes distributed ledger data to detect and identify the analytic information.

FIG. 8 illustrates ledger 1 in wireless data network 100. This design of ledger 1 is exemplary and ledgers 1-12 could be configured and operated differently in other examples. Ledger blocks 1-N are shown for a specific network slice. Ledger blocks 1-N each comprise ledger circuitry and software as described above, and this circuitry and software is distributed across several network cores and/or other computer systems. Slice block 1 represents the genesis block for the network slice. Slice block 1 is typically based on the genesis block template in the slice configuration or NSD for the network slice.

For the network slice, slice block 1 comprises: a slice oracle interface, slice block application, and slice block 1 data. The slice block 1 data comprises block data, slice data, and change data. The block data includes a hash of the previous block, a genesis block initiator ID, nonce, time stamps, roots, hashes, and the like. The slice oracle interface and slice block application are immutable for ledger 1.

The slice oracle interface receives slice status data from the slice oracles and transfers the slice data to the slice block application. The slice block application reaches a consensus on new slice data with other slice block applications that are executing in parallel for ledger 1. After consensus is reached, the slice block application stores the new slice data. The slice block application processes the new slice data to generate slice output data. For example, the block application could be a user credit application and a slice data output could be a current user balance. The slice block application reaches a consensus on slice output data with other slice block applications that are executing in parallel for ledger 1. After consensus is reached, the slice block application transfers the slice output data to the slice oracle interface for delivery to the slice oracles.

The slice block application compares the new slice data to the previous slice data to detect slice state changes. The slice block application generates and stores change metadata that indicates the state changes. The slice block application transfers the change metadata to the oracle interface. The oracle interface transfers the state change metadata to the oracles for subsequent filtering and analysis.

The data network circuitry described above comprises computer hardware and software that form a special-purpose machine—circuitry that analyzes status data from distributed ledgers to detect target conditions and information. The computer hardware comprises processing circuitry like CPUs, DSPs, Graphical Processing Units (GPUs), transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose circuitry that analyzes wireless communication network status data for distributed ledgers to detect target conditions and information.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless data network to analyze distributed ledger data, the method comprising:

Radio Access Networks (RANs) wirelessly exchanging user data with User Equipments (UEs), exchanging a local portion of the user data among the RANs, and exchanging a core portion of the user data with core networks;

the core networks exchanging the core portion of the user data with the RANs, exchanging a network portion of the core portion of the user data among the core networks, and exchanging an external portion of the core portion of the user data with external data networks;

the core networks transferring core information to distributed ledgers that characterizes the user data exchanges;

the distributed ledgers receiving the core information, adding core data that characterizes core information state changes, and storing the core information;

the RANs transferring RAN information that characterizes the user data exchanges to the core networks;

the core networks transferring the RAN information to the distributed ledgers;

the distributed ledgers receiving the RAN information, adding RAN data that characterizes RAN information state changes, and storing the RAN information;

the UEs transferring UE information that characterizes the user data exchanges to the RANs;

the RANs transferring the UE information to the core networks;

the core networks transferring the UE information to distributed ledgers;

the distributed ledgers receiving the UE information, adding UE data that characterizes UE information state changes, and storing the UE information; and a data analytics engine filtering the core data, processing the filtered core data to detect core information states, transferring core analytic data associated with the detected core information states, filtering the RAN data, processing the filtered RAN data to detect RAN information states, transferring RAN analytic data associated with the detected RAN information states, filtering the UE data, processing the filtered UE data to detect UE information states, and transferring UE analytic data associated with the detected UE information states.

2. The method of claim 1 further comprising the data analytics engine processing the UE analytic data, the RAN analytic data, and the core analytic data in combination to detect wireless data network states, and transferring network analytic data associated with the detected wireless data network states.

3. The method of claim 1 further comprising the data analytics engine processing the UE analytic data, the RAN analytic data, and the core analytic data in combination to detect network core states and transferring additional core data associated with the detected network core states.

4. The method of claim 1 further comprising the data analytics engine processing the UE analytic data, the RAN analytic data, and the core analytic data in combination to detect RAN states and transferring additional RAN data associated with the detected RAN states.

5. The method of claim 1 further comprising the data analytics engine processing the UE analytic data, the RAN analytic data, and the core analytic data in combination to detect UE states and transferring additional UE data associated with the detected UE states.

6. The method of claim 1 wherein the distributed ledgers and the data analytics engine comprise a wireless data network slice.

7. The method of claim 1 wherein the RANs, the core networks, the distributed ledgers, and the data analytics engine comprise a wireless data network slice.

8. The method of claim 1 wherein the distributed ledgers receiving the UE information, the RAN information, and the core information and adding the UE data, the RAN data, and the core data comprises ledger oracles generating the UE data, the RAN data, and the core data.

9. A wireless data network to analyze distributed ledger data comprising:

Radio Access Networks (RANs) configured to wirelessly exchange user data with User Equipments (UEs), exchange a local portion of the user data among the RANs, and exchange a core portion of the user data with core networks;

the core networks configured to exchange the core portion of the user data with the RANs, exchange a network portion of the core portion of the user data among the core networks, and exchange an external portion of the core portion of the user data with external data networks;

the core networks configured to transfer core information to distributed ledgers that characterizes the user data exchanges;

the distributed ledgers configured to receive the core information, add core data that characterizes core information state changes, and store the core information;

the RANs configured to transfer RAN information that characterizes the user data exchanges to the core networks;

the core networks configured to transfer the RAN information to the distributed ledgers;

the distributed ledgers configured to receive the RAN information, add RAN data that characterizes the RAN information state changes, and store the RAN information;

the UEs configured to transfer UE information that characterizes the user data exchanges to the RANs;

the RANs configured to transfer the UE information to the core networks;

the core networks configured to transfer the UE information to distributed ledgers;

the distributed ledgers configured to receive the UE information, add UE data that characterizes UE information state changes, and store the UE information; and a data analytics engine configured to filter the core data, process the filtered core data to detect core information states, transfer core analytic data associated with the detected core information states, filter the RAN data, process the filtered RAN data to detect RAN information states, transfer RAN analytic data associated with the detected RAN information states, filter the UE data, process the filtered UE data to detect UE information states, and transfer UE analytic data associated with the detected UE information states.

10. The wireless data network of claim 9 further comprising the data analytics engine configured to process the UE analytic data, the RAN analytic data, and the core analytic data in combination to detect wireless data network states and transfer network analytic data associated with the detected wireless data network states.

11. The wireless data network of claim 9 further comprising the data analytics engine configured to process the UE analytic data, the RAN analytic data, and the core analytic data in combination to detect core states and transfer additional core data associated with the detected core states.

12. The wireless data network of claim 9 further comprising the data analytics engine configured to process the UE analytic data, the RAN analytic data, and the core analytic data in combination to detect RAN states and transfer additional RAN data associated with the detected RAN states.

13. The wireless data network of claim 9 further comprising the data analytics engine configured to process the UE analytic data, the RAN analytic data, and the core analytic data in combination to detect UE states and transfer additional UE data associated with the detected UE states.

14. The wireless data network of claim 9 wherein the distributed ledgers and the data analytics engine comprise a wireless data network slice.

15. The wireless data network of claim 9 wherein the RANs, the network cores, the distributed ledgers, and the data analytics engine comprise a wireless data network slice.

16. The wireless data network of claim 9 wherein the distributed ledgers comprise ledger oracles configured to receive the UE information, the RAN information, and the core information and generate the UE data, the RAN data, and the core data.

* * * * *